(12) United States Patent
Shiina et al.

(10) Patent No.: US 9,608,521 B2
(45) Date of Patent: Mar. 28, 2017

(54) DC/DC CONVERTER ACTIVATION STABILITY CONTROL

(71) Applicant: Seiko Instruments Inc., Chiba-shi, Chiba (JP)

(72) Inventors: Yoshiomi Shiina, Chiba (JP); Masayuki Uno, Ina (JP)

(73) Assignee: SII SEMICONDUCTOR CORPORATION, Chiba (JP)

( * ) Notice: Subject to any disclaimer, the term of this patent is extended or adjusted under 35 U.S.C. 154(b) by 44 days.

(21) Appl. No.: 14/643,743

(22) Filed: Mar. 10, 2015

(65) Prior Publication Data

US 2015/0263616 A1 Sep. 17, 2015

(30) Foreign Application Priority Data

Mar. 11, 2014 (JP) .................................. 2014-047939
Dec. 5, 2014 (JP) .................................. 2014-247063

(51) Int. Cl.
*H02M 3/156* (2006.01)
*G05F 1/00* (2006.01)
*H02M 3/157* (2006.01)

(52) U.S. Cl.
CPC .............. *H02M 3/156* (2013.01); *G05F 1/00* (2013.01); *H02M 3/157* (2013.01)

(58) Field of Classification Search
CPC ............................... H02M 3/157; H02M 3/156
USPC ......................................... 323/283, 284, 282
See application file for complete search history.

(56) References Cited

U.S. PATENT DOCUMENTS

| 6,066,943 A | * | 5/2000 | Hastings | ............... | H02M 3/156 |
| | | | | | 323/285 |
| 2005/0122056 A1 | * | 6/2005 | Langeslag | ........... | H02M 3/3385 |
| | | | | | 315/209 R |
| 2012/0274300 A1 | * | 11/2012 | Nakashima | ........... | H02M 3/156 |
| | | | | | 323/284 |
| 2013/0038236 A1 | * | 2/2013 | Mitarashi | ............... | H02M 3/156 |
| | | | | | 315/240 |

FOREIGN PATENT DOCUMENTS

JP          2011-182533 A          9/2011

* cited by examiner

*Primary Examiner* — Jue Zhang
*Assistant Examiner* — Trinh Dang
(74) *Attorney, Agent, or Firm* — Brinks Gilson & Llone

(57) ABSTRACT

Provided is a DC/DC converter capable of operating a circuit to perform stable control even when an output voltage becomes 0 V at the time of activation of a power supply voltage or due to a load short circuit. The DC/DC converter includes an ON-timer circuit including: a ripple generation circuit configured to generate and output a ripple component based on a control signal; an averaging circuit configured to output a signal obtained by averaging an output of the ripple generation circuit; a timer circuit configured to generate and output an ON-time signal based on the signal of the averaging circuit and the control signal; and an activation circuit configured to increase a voltage of an output terminal of the ripple generation circuit to a predetermined voltage.

6 Claims, 7 Drawing Sheets

DC-DC Converter Circuit (Embodiment 1)

DC-DC Converter Circuit (Embodiment 1)

On-Timer Circuit (111) (Embodiment 1)

DC-DC Converter Timing Chart

Comparator Circuit (112) (Embodiment 2)

On-Timer Circuit (111) (Embodiment 3)

DC-DC Converter Circuit (Embodiment 2)

DC-DC Converter Circuit

DC/DC CONVERTER ACTIVATION STABILITY CONTROL

RELATED APPLICATIONS

This application claims priority under 35 U.S.C. §119 to Japanese Patent Application Nos. 2014-047939 filed on Mar. 11, 2014 and 2014-247063 filed on Dec. 5, 2014, the entire contents of which are hereby incorporated by reference.

BACKGROUND OF THE INVENTION

1. Field of the Invention

The present invention relates to a DC/DC converter configured to convert a DC voltage, and more particularly, to a DC/DC converter including a timer circuit.

2. Description of the Related Art

A related-art DC/DC converter is now described. FIG. 8 is a circuit diagram illustrating the related-art DC/DC converter.

The related-art DC/DC converter includes a comparator 504, an RS-FF circuit 113, a drive circuit 110, a reference voltage generation circuit 503, a timer circuit 501, NMOS transistors 108 and 109, a capacitor 107, a coil 106, resistors 103, 104, and 502, a ground terminal 100, an output terminal 102, and a power supply terminal 101.

The comparator 504 has an inverting input terminal for inputting a divided voltage obtained by dividing an output voltage Vout of the output terminal 102 and a non-inverting input terminal for inputting a reference voltage obtained by adding a ripple voltage, which depends on a power supply voltage and the output voltage Vout, and a slope voltage, which changes with a predetermined slope, to each other. The comparator 504 outputs a signal corresponding to the result of comparison. When the divided voltage is higher than the reference voltage, the comparator 504 outputs a signal of Low level to a set terminal of the RS-FF circuit 113. When the divided voltage is lower than the reference voltage, the comparator 504 outputs a signal of High level to the set terminal of the RS-FF circuit 113. A reset terminal of the RS-FF circuit 113 is supplied with a signal output from the timer circuit 501. An output signal is output from a Q terminal of the RS-FF circuit 113 in accordance with the output signal of the comparator 504 and the output signal of the timer circuit 501. The drive circuit 110 controls on and off of the NMOS transistors 108 and 109 in response to the signal from the RS-FF circuit 113, to thereby generate the output voltage Vout from the output terminal 102 (see, for example, Japanese Patent Application Laid-open No. 2011-182533).

However, the related-art DC/DC converter has a problem in that, when the output voltage becomes 0 V at the time of activation of a power supply voltage or due to a load short-circuit, the timer circuit may fail to operate so that the DC/DC converter may fail to be activated.

SUMMARY OF THE INVENTION

The present invention has been made in view of the above-mentioned problem, and provides a DC/DC converter capable of operating a circuit to perform stable control even when an output voltage becomes 0 V at the time of activation of a power supply voltage or due to a load short-circuit.

In order to solve the problem in the related art, a DC/DC converter according to one embodiment of the present invention is configured as follows.

The DC/DC converter includes an ON-timer circuit including: a ripple generation circuit configured to generate and output a ripple component based on a control signal; an averaging circuit configured to output a signal obtained by averaging an output of the ripple generation circuit; a timer circuit configured to generate and output an ON-time signal based on the signal of the averaging circuit and the control signal; and an activation circuit configured to increase a voltage of an output terminal of the ripple generation circuit to a predetermined voltage.

According to the DC/DC converter of the one embodiment of the present invention, when the output voltage becomes 0 V at the time of activation of the power supply voltage or due to a load short-circuit, the circuit can be operated to perform stable control by increasing the output voltage of the ripple generation circuit by the activation circuit.

DETAILED DESCRIPTION OF THE PREFERRED EMBODIMENT

Now, an embodiment of the present invention is described with reference to the accompanying drawings.

Figure 1:
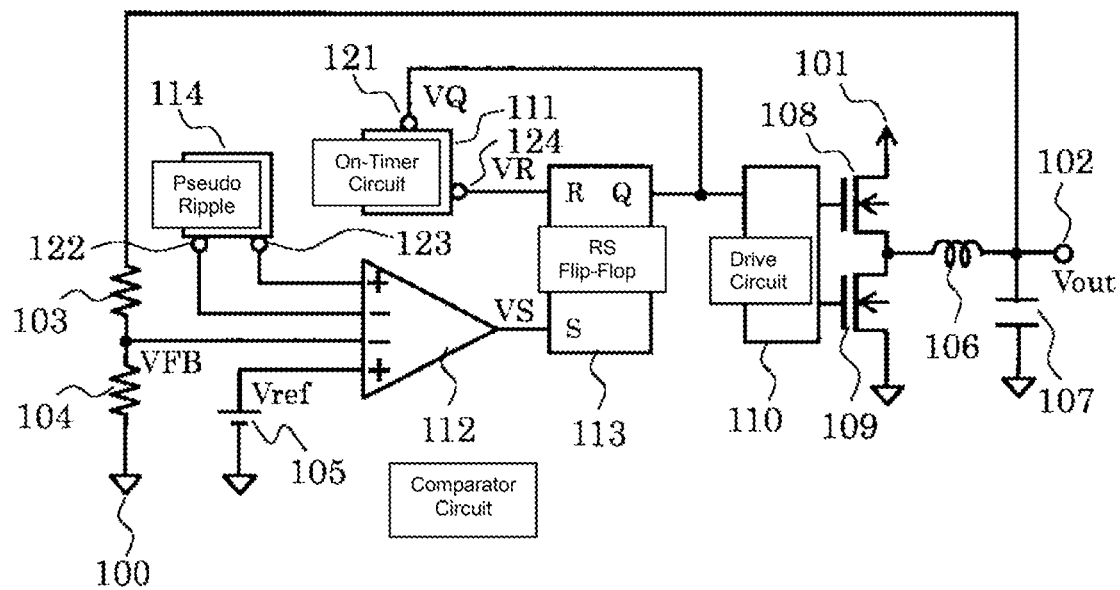
FIG. 1 is a circuit diagram illustrating a configuration of a DC/DC converter according to an embodiment of the present invention.

FIG. 1 is a circuit diagram of a DC/DC converter according to this embodiment.

The DC/DC converter according to this embodiment includes a comparator 112, an RS-FF circuit 113, a pseudo ripple circuit 114, a drive circuit 110, a reference voltage circuit 105, an ON-timer circuit 111 having an input terminal 112 and an output terminal 124, NMOS transistors 108 and 109, a capacitor 107, a coil 106, resistors 103 and 104 forming a voltage dividing circuit, a ground terminal 100, an output terminal 102, and a power supply terminal 101.

Figure 2:
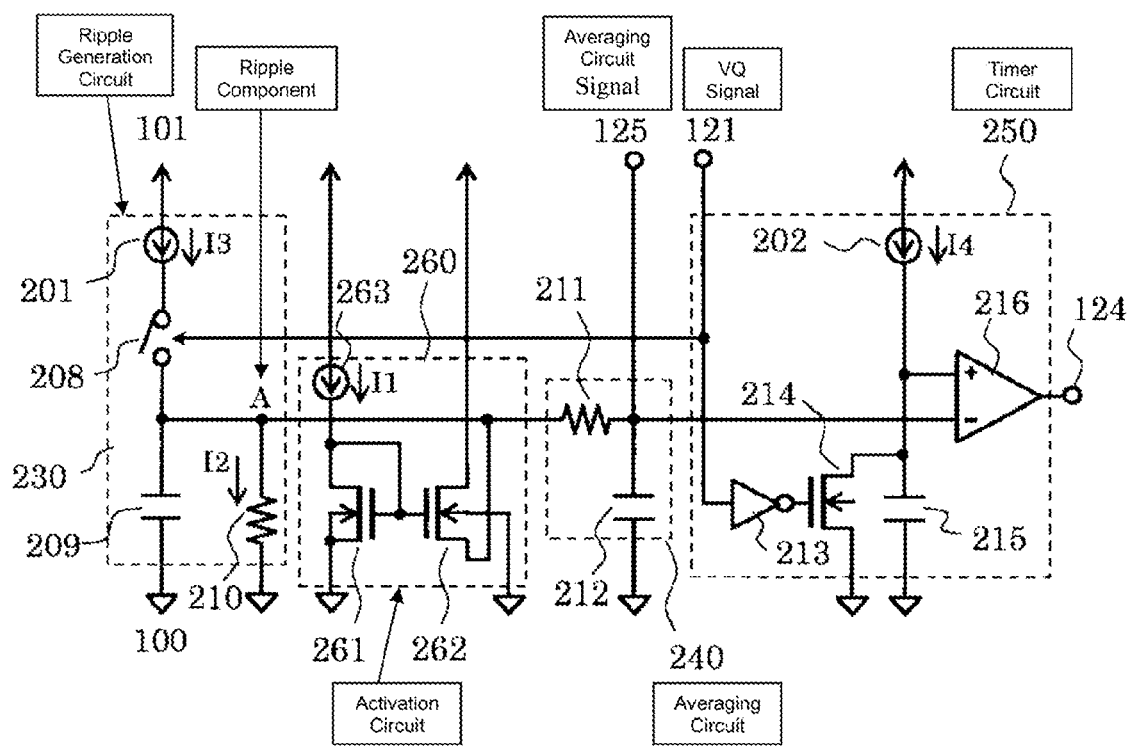
FIG. 2 is a circuit diagram illustrating a configuration of an ON-timer circuit of the DC/DC converter according to this embodiment.

FIG. 2 is a circuit diagram illustrating a configuration of the ON-timer circuit 111. The ON-timer circuit 111 includes a ripple generation circuit 230, an averaging circuit 240, a timer circuit 250, an activation circuit 260, an input terminal 121, and output terminals 124 and 125. The ripple generation circuit 230 includes a constant current circuit 201, a switch circuit 208, a capacitor 209, and a resistor 210. The averaging circuit 240 includes a resistor 211 and a capacitor 212. The timer circuit 250 includes a constant current circuit 202, an inverter 213, an NMOS transistor 214, a capacitor 215, and a comparator 216. The activation circuit 260 includes a constant current circuit 263 and NMOS transistors 261 and 262.

Figure 3:
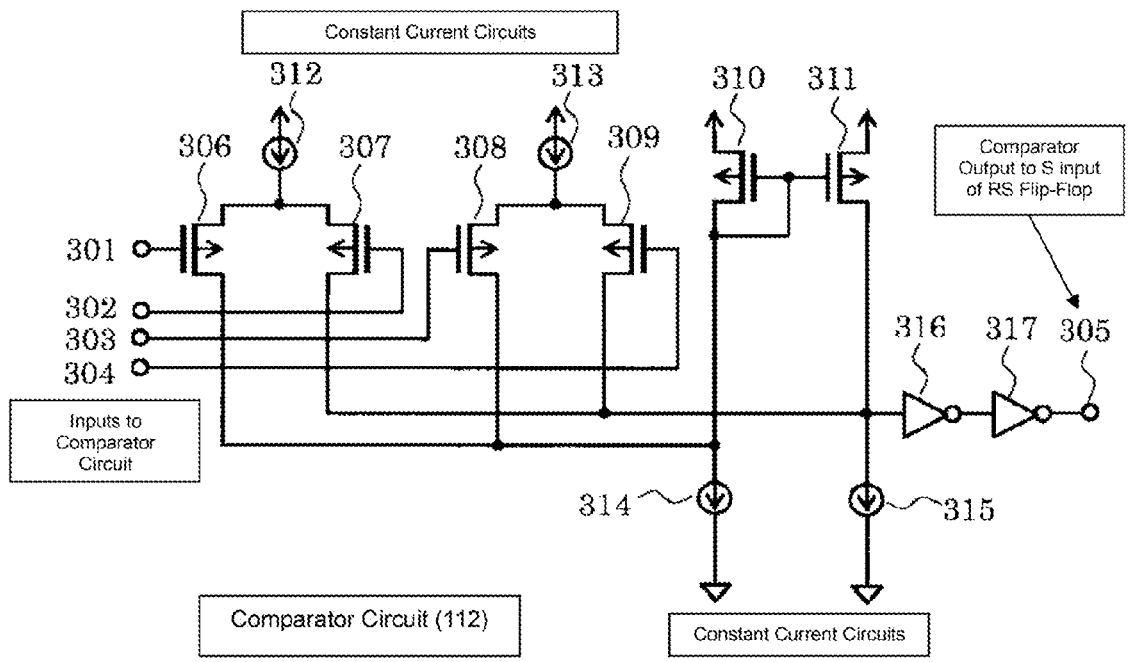
FIG. 3 is a circuit diagram illustrating a configuration of a comparator of the DC/DC converter according to this embodiment.

FIG. 3 is a circuit diagram illustrating the comparator 112. The comparator 112 includes PMOS transistors 306, 307, 308, 309, 310, and 311, constant current circuits 312, 313, 314, and 315, inverters 316 and 317, a first non-inverting input terminal 301, a first inverting input terminal 302, a second non-inverting input terminal 303, a second inverting input terminal 304, and an output terminal 305.

Next, connections in the DC/DC converter according to this embodiment are described.

The comparator 112 has the first inverting input terminal 302 connected to an output terminal 122 of the pseudo ripple circuit 114, the first non-inverting input terminal 301 connected to an output terminal 123 of the pseudo ripple circuit 114, the second inverting input terminal 304 connected to a connection point between one terminal of the resistor 103 and one terminal of the resistor 104, the second non-inverting input terminal 303 connected to a positive electrode of the reference voltage circuit 105, and the output terminal 305 connected to a set (S) terminal of the RS-FF circuit 113. The other terminal of the resistor 103 is connected to the output terminal 102. The other terminal of the resistor 104 is connected to the ground terminal 100. The reference voltage circuit 105 has a negative electrode connected to the ground terminal 100. The RS-FF circuit 113 has a reset (R) terminal connected to the output terminal 124 of the ON-timer circuit 111, and an output terminal connected to the drive circuit 110 and the input terminal 121 of the ON-timer circuit 111. The NMOS transistor 108 has a gate connected to a first output terminal of the drive circuit 110, a drain connected to the power supply terminal 101, and a source connected to one terminal of the coil 106 and a drain of the NMOS transistor 109. The NMOS transistor 109 has a gate connected to a second output terminal of the drive circuit 110 and a source connected to the ground terminal 100. The capacitor 107 has one terminal connected to the output terminal 102 and the other terminal of the coil 106. The other terminal of the capacitor 107 is connected to the ground terminal 100.

Connections in the ON-timer circuit 111 are now described. The constant current circuit 201 has one terminal connected to the power supply terminal 101 and the other terminal connected to one terminal of the switch circuit 208. The capacitor 209 has one terminal connected to the other terminal of the switch circuit 208, one terminal of the resistor 210, and one terminal (node A) of the resistor 211. The other terminal of the capacitor 209 is connected to the ground terminal 100. The other terminal of the resistor 210 is connected to the ground terminal 100. The other terminal of the resistor 211 is connected to the output terminal 125 and one terminal of the capacitor 212. The other terminal of the capacitor 212 is connected to the ground terminal 100. The input terminal 121 is connected to a terminal for controlling an input terminal of the inverter 213 and on and off of the switch circuit 208. The inverter 213 has an output terminal connected to a gate of the NMOS transistor 214. The NMOS transistor 214 has a drain connected to one terminal of the capacitor 215 and one terminal of the constant current circuit 202, and a source connected to the ground terminal 100. The other terminal of the capacitor 215 is connected to the ground terminal 100. The other terminal of the constant current circuit 202 is connected to the power supply terminal 101. The comparator 216 has a non-inverting input terminal connected to the one terminal of the capacitor 215, an inverting input terminal connected to the one terminal of the capacitor 212, and an output terminal connected to the output terminal 124. The constant current circuit 263 has one terminal connected to the power supply terminal 101 and the other terminal connected to a gate and a drain of the NMOS transistor 261. The NMOS transistor 261 has a source and a back gate that are connected to the ground terminal 100. The NMOS transistor 262 has a gate connected to the gate of the NMOS transistor 261, a drain connected to the power supply terminal 101, a source connected to the one terminal of the capacitor 209, and a back gate connected to the ground terminal 100.

Connections in the comparator 112 are now described. The constant current circuit 312 has one terminal connected to the power supply terminal 101 and the other terminal connected to a source of the PMOS transistor 306 and a source of the PMOS transistor 307. The PMOS transistor 306 has a gate connected to the first non-inverting input terminal 301, and a drain connected to a connection point between one terminal of the constant current circuit 314 and a gate and a drain of the PMOS transistor 310. The PMOS transistor 307 has a gate connected to the first inverting input terminal 302 and a drain connected to an input terminal of the inverter 316. The constant current circuit 313 has one terminal connected to the power supply terminal 101 and the other terminal connected to a source of the PMOS transistor 308 and a source of the PMOS transistor 309. The PMOS transistor 308 has a gate connected to the second non-inverting input terminal 303, and a drain connected to the connection point between the one terminal of the constant current circuit 314 and the gate and the drain of the PMOS transistor 310. The PMOS transistor 309 has a gate connected to the second inverting input terminal 304 and a drain connected to the input terminal of the inverter 316. The PMOS transistor 310 has a source connected to the power supply terminal 101. The other terminal of the constant current circuit 314 is connected to the ground terminal 100. The PMOS transistor 311 has a gate connected to the gate of the PMOS transistor 310, a drain connected to the input terminal of the inverter 316, and a source connected to the power supply terminal 101. The constant current circuit 315 has one terminal connected to the input terminal of the inverter 316 and the other terminal connected to the ground terminal 100. The inverter 317 has an input terminal connected to an output terminal of the inverter 316 and an output terminal connected to the output terminal 305.

Next, an operation of the DC/DC converter according to this embodiment is described.

When a power supply voltage VDD is input to the power supply terminal 101, the DC/DC converter outputs an output voltage Vout from the output terminal 102. The resistors 103 and 104 divide the output voltage Vout to output a divided voltage VFB. The comparator 112 has a four-terminal input configuration as illustrated in FIG. 3. The comparator 112 compares a reference voltage Vref of the reference voltage circuit 105, which is input to the second non-inverting input terminal, the divided voltage VFB input to the second inverting input terminal, a voltage output from the output terminal 122 of the pseudo ripple circuit 114, which is input to the first inverting input terminal, and a voltage output from the output terminal 123 of the pseudo ripple circuit 114, which is input to the first non-inverting input terminal, and outputs a signal VS from the output terminal of the comparator 112. The ON-timer circuit 111 inputs a signal VQ from the input terminal 121, and outputs an ON-time signal VR from the output terminal 124. The RS-FF circuit 113 inputs the ON-time signal VR from the R terminal, inputs the signal VS from the S terminal, and outputs the signal VQ from the Q terminal.

Figure 4:
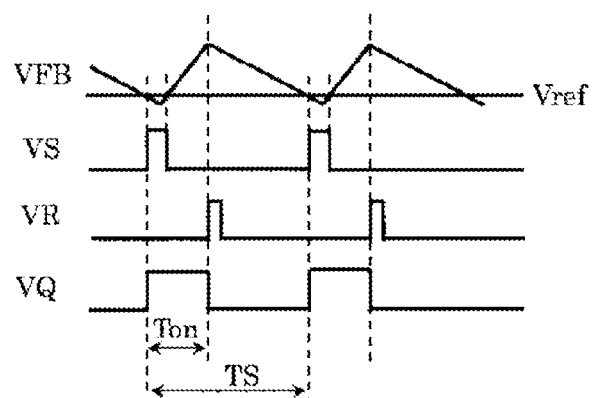
FIG. 4 is a timing chart illustrating an operation of the DC/DC converter according to this embodiment.

FIG. 4 is a timing chart illustrating the operation of the DC/DC converter according to this embodiment. When the divided voltage VFB falls below the reference voltage Vref, the signal VS becomes High level to set the signal VQ of the Q terminal of the RS-FF circuit 113 to High level. Then, the signal VQ is input to the drive circuit 110, and the NMOS transistor 108 is turned on while the NMOS transistor 109 is turned off in accordance with the signal VQ, to thereby increase the divided voltage VFB (output voltage Vout). When the ON-time signal VR output from the output terminal 124 of the ON-timer circuit 111 becomes High level, the signal VQ becomes Low level by the RS-FF circuit 113, and the NMOS transistor 108 is turned off while the NMOS transistor 109 is turned on, to thereby decrease the divided voltage VFB (output voltage Vout). A time period during which the signal VQ is at High level is represented by "Ton", and a time period from when the signal VQ becomes High level to when the signal VQ becomes High level again is represented by "TS". The output voltage Vout is generated from the output terminal 102 through control of the NMOS transistor 108 and the NMOS transistor 109 that serve as output transistors in accordance with a cycle of the time period TS.

In the comparator 112, the voltage output from the output terminal 122 of the pseudo ripple circuit 114 is input to the first inverting input terminal thereof, and is accordingly added to the divided voltage VFB input to the second inverting input terminal in the comparator 112. In this manner, the divided voltage VFB becomes a voltage containing a ripple component. Then, the voltage output from the output terminal 123 of the pseudo ripple circuit 114 is input to the first non-inverting input terminal of the comparator 112, and is accordingly added to the reference voltage Vref input to the second non-inverting input terminal in the comparator 112. Those two added signals are compared to each other, and the signal VS is output from the comparator 112.

A current flowing through the constant current circuit 201 included in the ON-timer circuit 111 is represented by "I3", a current flowing through the constant current circuit 202 is represented by "I4", and a current flowing through the resistor 210 is represented by "I2". When a resistance value of the resistor 210 is represented by "R2", the current I2 is expressed as I2=Vcref0/R2. The switch circuit 208 is controlled to be turned on and off by the signal VQ. When the signal VQ is at High level, the switch circuit 208 is turned on, and the capacitor 209 is charged with the current I3 and discharged with the current I2. Further, when the signal VQ is at Low level, the switch circuit 208 is turned off, and electric charges of the capacitor 209 are discharged with the current I2. When an electric charge amount in charging is represented by "Q1" and an electric charge amount in discharging is represented by "Q2", the electric charge amounts are expressed as Q1=I3×Ton and Q2=I2×TS. Because Q1=Q2 is established, I3×Ton=I2×TS is established and Ton/TS=I2/I3=Vout/VDD is established. Accordingly, Vout=VDD×I2/I3 is established.

Because I2=Vcref0/R2 is established, Vout=VDD×Vcref0/R2/I3 is established and Vcref0=Vout/VDD×R2×I3 is established. Accordingly, the voltage Vcref0 can be regarded as a voltage that is proportional to the output voltage Vout, and contains a ripple component of the output voltage. A voltage Vcref of the averaging circuit 240 is obtained by removing the ripple component of the voltage Vcref0 by averaging the voltage Vcref0 with the resistor 211 and the capacitor 212. Accordingly, the voltage Vcref is a voltage which is proportional to the output voltage Vout and from which a ripple component is removed, that is, Vcref=Vout/VDD×R2×I3 is established.

The gate of the NMOS transistor 214 inputs the signal VQ via the inverter 213, and hence the NMOS transistor 214 is controlled to be turned on and off at the timings opposite to those by the signal VQ. A voltage of the non-inverting input terminal of the comparator 216 is represented by "Vcap". When the NMOS transistor 214 is turned off, the capacitor 215 is charged with the current I4 to increase the voltage value of the voltage Vcap. When the voltage Vcap is lower than the voltage Vcref, the ON-time signal VR of Low level is output from the output terminal 124 of the comparator 216. When the voltage Vcap is higher than the voltage Vcref, the ON-time signal VR of High level is output from the output terminal 124 of the comparator 216. Then, the signal VQ becomes Low level by the RS-FF circuit 113 so that the NMOS transistor 214 is turned on to discharge the electric charges of the capacitor 215, to thereby decrease the voltage Vcap.

When a capacitance value of the capacitor 215 is represented by "C2", the ON-time Ton is expressed as Ton=C2/I4×Vcref=C2×I3/I4×R2×Vout/VDD, and hence the ON-time Ton is controlled by the duty ratio expressed by Vout/VDD.

At the time of activation of power supply when the power supply voltage VDD is input to the power supply terminal 101, a voltage at each node has not risen and is 0 V, and the node A also has 0 V because the switch circuit 208 included in the ON-timer circuit 111 is turned off. From this state, the constant current circuit 263 included in the activation circuit 260 first operates to cause a current I1 to flow, and the current I1 is mirrored by a current mirror formed of the NMOS transistors 261 and 262. Then, the capacitor 209 is charged to increase the voltage of the node A. A gate-source voltage of the NMOS transistor 261 is represented by "Vgs261" and a threshold of the NMOS transistor 262 is represented by "Vth262". When the voltage of the node A increases to be higher than Vgs261−Vth262, the NMOS transistor 262 is turned off to stop the flow of the current. Then, the increase in voltage of the node A due to the charge of the capacitor 209 is stopped. After that, the voltage Vcref0 is generated at the node A by the ripple generation circuit 230 to perform the normal control. The voltage generated at the output terminal 125 is obtained by removing the ripple component from the voltage of the node A and accordingly has the same magnitude as that of the voltage of the node A. Thus, the voltage generated at the output terminal 125 increases in the same manner as that of the voltage of the node A. The ON-time can be generated based on the voltage generated at the output terminal 125 at this time. Consequently, it is possible to prevent a phenomenon that the voltage of the node A or the output terminal 125 does not increase but stays at 0 V at the time of activation of power supply, and a signal of High level is continued to be output from the output terminal 124 so that the DC/DC converter is not activated. The time period for charging the capacitor 209 can be adjusted through change of the current value of the constant current circuit 263 and the ratio of the current mirror formed of the NMOS transistors 261 and 262, and hence can be adjusted depending on an activation time period of the DC/DC converter.

Note that, a description has been given of the operation performed at the time of activation of power supply, but also in the case where the DC/DC converter stops its operation due to a load short-circuit and then the output voltage becomes 0 V and the node A has 0 V, the DC/DC converter can be operated similarly to prevent a phenomenon that the DC/DC converter fails to operate.

As described above, according to the DC/DC converter of this embodiment, at the time of activation of power supply or when a load short-circuit occurs, the output voltage of the ripple generation circuit can be increased by the activation circuit so as to operate the circuit, and hence the stable control can be performed.

Figure 5:
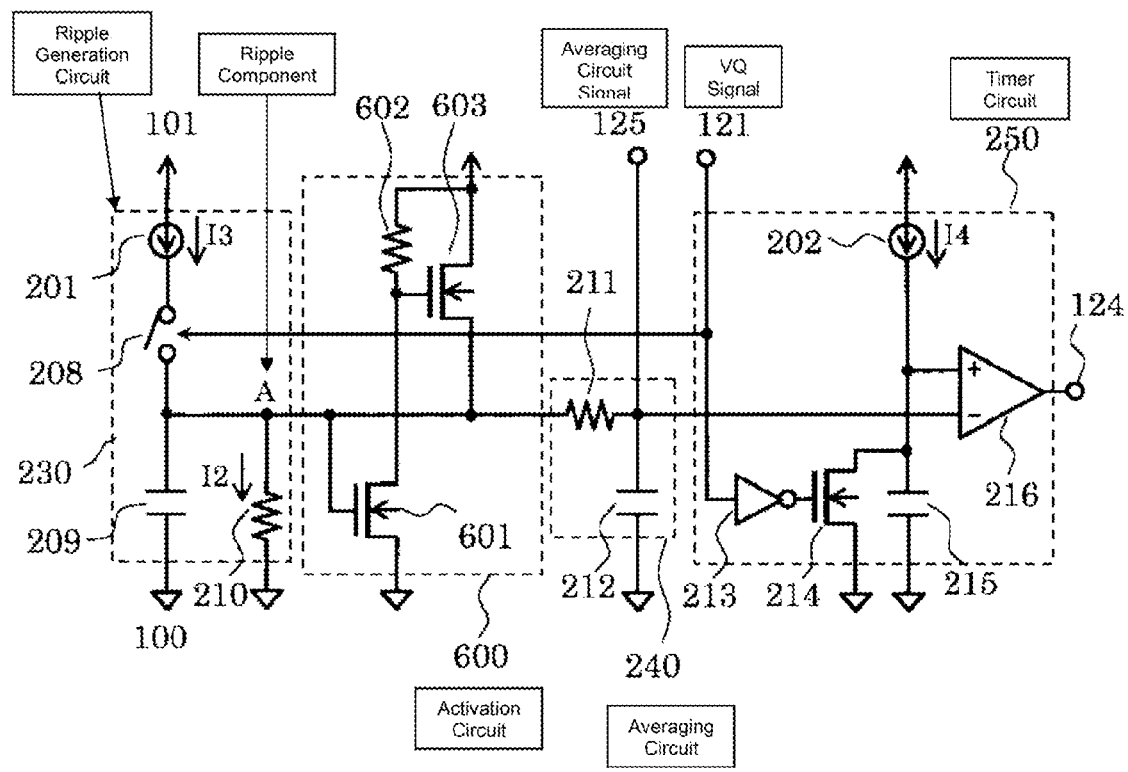
FIG. 5 is a circuit diagram illustrating another example of the configuration of the ON-timer circuit of the DC/DC converter according to this embodiment.

FIG. 5 is a circuit diagram illustrating another example of the ON-timer circuit of the DC/DC converter according to this embodiment. The difference from the circuit of FIG. 2 resides in that the activation circuit 260 is changed to an activation circuit 600. The activation circuit 600 includes NMOS transistors 601 and 603 and a resistor 602.

The NMOS transistor 603 has a gate connected to one terminal of the resistor 602, a drain connected to the other terminal of the resistor 602 and the power supply terminal 101, and a source connected to the node A. The NMOS transistor 601 has a gate connected to the node A, a drain connected to the gate of the NMOS transistor 603, and a source connected to the ground terminal 100. The other configurations are the same as those of the circuit of FIG. 2.

An operation of the DC/DC converter including the ON-timer circuit of FIG. 5 is now described. The operation in which the power supply voltage VDD is input to the power supply terminal 101 and the output voltage Vout of the output terminal 102 is controlled to be constant is the same as that of the DC/DC converter including the ON-timer circuit of FIG. 2.

An operation of the DC/DC converter including the ON-timer circuit of FIG. 5 at the time of activation of power supply is now described. At the time of activation of power supply when the power supply voltage VDD is input to the power supply terminal 101, a voltage at each node has not risen and is 0 V, and the node A of the ON-timer circuit 111 also has 0 V because the switch circuit 208 included in the ON-timer circuit 111 is turned off.

From this state, the gate of the NMOS transistor 603 is pulled up to the power supply voltage VDD, and hence the NMOS transistor 603 is turned on to cause a current to flow through the capacitor 209. Then, the capacitor 209 is charged to increase the voltage of the node A. A threshold of the NMOS transistor 601 is represented by "Vth601". When the voltage of the node A increases to be higher than Vth601, the NMOS transistor 601 is turned on to pull down the gate of the NMOS transistor 603, to thereby turn off the NMOS transistor 603. Then, the increase in voltage of the node A due to the charge of the capacitor 209 is stopped. After that, the voltage Vcref0 is generated at the node A by the ripple generation circuit 230 to perform the normal control. The voltage generated at the output terminal 125 is obtained by removing the ripple component from the voltage of the node A and accordingly has the same magnitude as that of the voltage of the node A. Thus, the voltage generated at the output terminal 125 increases in the same manner as that of the voltage of the node A. The ON-time can be generated based on the voltage generated at the output terminal 125 at this time. Consequently, it is possible to prevent a phenomenon that the voltage of the node A or the output terminal 125 does not increase but stays at 0 V at the time of activation of power supply, and a signal of High level is continued to be output from the output terminal 124 so that the DC/DC converter is not activated.

Note that, a description has been given of the operation performed at the time of activation of power supply, but also in the case where the DC/DC converter stops its operation due to a load short-circuit and then the output voltage becomes 0 V and the node A has 0 V, the DC/DC converter can be operated similarly to prevent a phenomenon that the DC/DC converter is not activated. Further, the resistor 602 is used as the element for pulling up the gate of the NMOS transistor 603 to the power supply voltage, but the configuration is not limited thereto, and any configuration may be employed as long as the element pulls up the gate of the NMOS transistor 603 to the power supply voltage.

As described above, according to the DC/DC converter including the ON-timer circuit of FIG. 5, immediately after the power supply voltage VDD is input or when a load short-circuit occurs, the output voltage of the ripple generation circuit can be increased by the activation circuit so as to operate the circuit, and hence the stable control can be performed.

Figure 6:
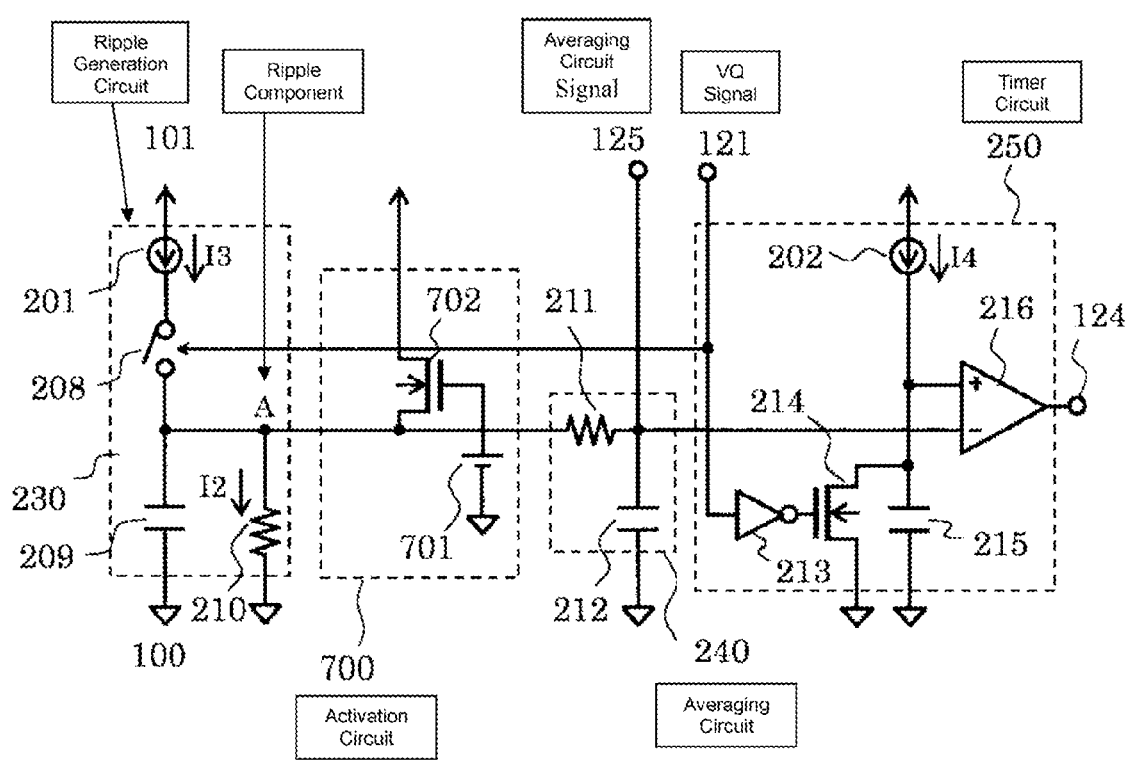
FIG. 6 is a circuit diagram illustrating still another example of the configuration of the ON-timer circuit of the DC/DC converter according to this embodiment.

FIG. 6 is a circuit diagram illustrating still another example of the ON-timer circuit of the DC/DC converter according to this embodiment. The difference from the circuit of FIG. 2 resides in that the activation circuit 260 is changed to an activation circuit 700. The activation circuit 700 includes an NMOS transistor 702 and a constant voltage circuit 701.

The NMOS transistor 702 has a gate connected to a positive electrode of the constant voltage circuit 701, a drain connected to the power supply terminal 101, and a source connected to the node A. The other configurations are the same as those of the circuit of FIG. 2.

An operation of the DC/DC converter including the ON-timer circuit of FIG. 6 is now described. The operation in which the power supply voltage VDD is input to the power supply terminal 101 and the output voltage Vout of the output terminal 102 is controlled to be constant is the same as that of the DC/DC converter including the ON-timer circuit of FIG. 2.

An operation of the DC/DC converter including the ON-timer circuit of FIG. 6 at the time of activation of power supply is now described. At the time of activation of power supply when the power supply voltage VDD is input to the power supply terminal 101, a voltage at each node has not risen and is 0 V, and the node A of the ON-timer circuit 111 also has 0 V because the switch circuit 208 included in the ON-timer circuit 111 is turned off.

From this state, the constant voltage circuit 701 first operates so that the NMOS transistor 702 is turned on to cause a current to flow through the capacitor 209. Then, the capacitor 209 is charged to increase the voltage of the node A. A threshold of the NMOS transistor 702 is represented by "Vth702", and a voltage of the constant voltage circuit 701 is represented by "V701". When the voltage of the node A increases to be higher than V701−Vth702, the NMOS transistor 702 is turned off to stop the increase in voltage of the node A due to the charge of the capacitor 209. After that, the voltage Vcref0 is generated at the node A by the ripple generation circuit 230 to perform the normal control. The voltage generated at the output terminal 125 is obtained by removing the ripple component from the voltage of the node A and accordingly has the same magnitude as that of the voltage of the node A. Thus, the voltage generated at the output terminal 125 increases in the same manner as that of the voltage of the node A. The ON-time can be generated based on the voltage generated at the output terminal 125 at this time. Consequently, it is possible to prevent a phenomenon that the voltage of the node A or the output terminal 125 does not increase but stays at 0 V at the time of activation of power supply, and a signal of High level is continued to be output from the output terminal 124 so that the DC/DC converter is not activated.

Note that, a description has been given of the operation performed at the time of activation of power supply, but also in the case where the DC/DC converter stops its operation due to a load short-circuit and then the output voltage becomes 0 V and the node A has 0 V, the DC/DC converter can be operated similarly to prevent a phenomenon that the DC/DC converter is not activated.

As described above, according to the DC/DC converter including the ON-timer circuit of FIG. 6, immediately after the power supply voltage VDD is input or when a load short-circuit occurs, the output voltage of the ripple generation circuit can be increased by the activation circuit so as to operate the circuit, and hence the stable control can be performed.

Note that, as the signal VQ to be input to the input terminal 121 of the ON-timer circuit 111, the signal of the Q terminal of the RS-FF circuit 113 is used, but a signal at another node may be used as long as the signal is synchronized with the signal to be input to the gate of the NMOS transistor 108.

Further, the comparator 112 employs a comparator having four-terminal inputs, but is not limited to this configuration as long as the voltage output from the output terminal 122 of the pseudo ripple circuit 114 and the divided voltage VFB are added to each other, and the voltage output from the output terminal 123 of the pseudo ripple circuit 114 and the reference voltage Vref are added to each other. For example, an adder configured to add the voltage output from the output terminal 122 of the pseudo ripple circuit 114 and the divided voltage VFB to each other and an adder configured to add the voltage output from the output terminal 123 of the pseudo ripple circuit 114 and the reference voltage Vref to each other may be connected, and a comparator having two-terminal inputs configured to compare those signals may be employed.

Figure 7:
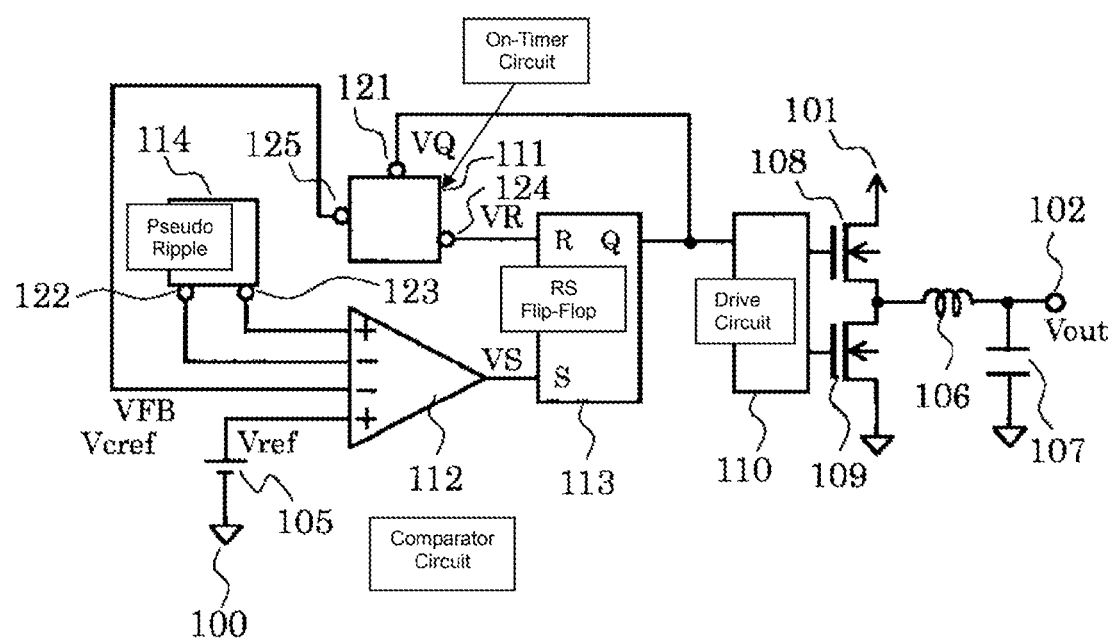
FIG. 7 is a circuit diagram illustrating another configuration of the DC/DC converter according to this embodiment.
Figure 8:
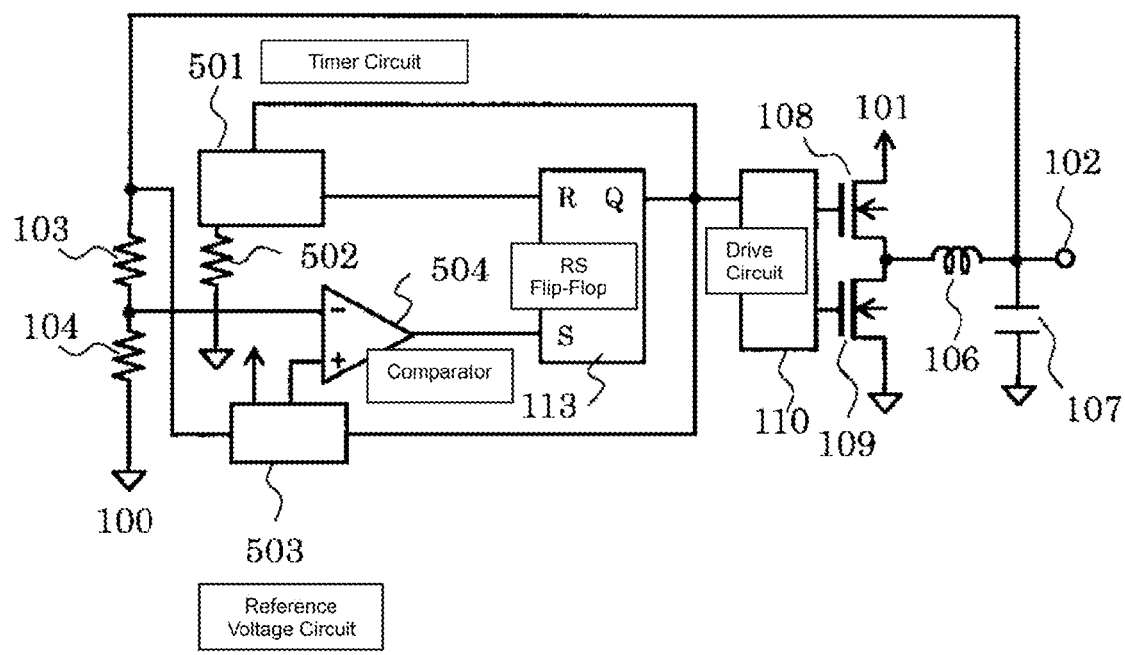
FIG. 8 is a circuit diagram illustrating a configuration of a related-art DC/DC converter.

FIG. 7 is a circuit diagram illustrating another example of the DC/DC converter using the ON-timer circuit according to this embodiment. The difference from the DC/DC converter according to the embodiment of FIG. 1 resides in that the voltage Vcref is output from the output terminal 125 of the ON-timer circuit 111 and input to the second inverting input terminal of the comparator 112 so that the resistors 103 and 104 configured to divide the output voltage Vout are removed.

An operation of the DC/DC converter of FIG. 7 is described.

When the power supply voltage VDD is input to the power supply terminal 101, the DC/DC converter outputs the output voltage Vout from the output terminal 102. The comparator 112 has a four-terminal input configuration as illustrated in FIG. 3. The comparator 112 compares the reference voltage Vref of the reference voltage circuit 105, which is input to the second non-inverting input terminal, the voltage Vcref output from the ON-timer circuit 111, which is input to the second inverting input terminal, the voltage output from the output terminal 122 of the pseudo ripple circuit 114, which is input to the first inverting input terminal, and the voltage output from the output terminal 123 of the pseudo ripple circuit 114, which is input to the first non-inverting input terminal, and outputs the signal VS from the output terminal of the comparator 112. The ON-timer circuit 111 inputs the signal VQ from the input terminal 121, outputs the ON-time signal VR from the output terminal 124, and outputs the voltage Vcref from the output terminal 125. The RS-FF circuit 113 inputs the ON-time signal VR from the R terminal, inputs the signal VS from the S terminal, and outputs the signal VQ from the Q terminal.

In the ON-timer circuit 111 according to this embodiment, the averaging circuit 240 generates an averaged voltage Vcref proportional to the output voltage Vout without directly using the output voltage Vout. The output voltage Vcref of the averaging circuit 240 is Vcref=Vout/VDD×R2×I1, where I1=VDD×K. Accordingly, Vcref=Vout/VDD×R2×VDD×K is established and Vcref=Vout×R2×K is established. Thus, the output voltage Vcref and the output voltage Vout have a proportional relationship, and Vout=Vcref×R2×K is established. Consequently, a desired output voltage Vout can be obtained through the control of the output voltage Vcref.

When the output voltage Vcref of the averaging circuit 240 falls below the reference voltage Vref, the signal VS becomes High level to set the signal VQ of the Q terminal of the RS-FF circuit 113 to High level. Then, the signal VQ is input to the drive circuit 110, and the NMOS transistor 108 is turned on while the NMOS transistor 109 is turned off in accordance with the signal VQ, to thereby increase the output voltage Vout. When the ON-time signal VR output from the output terminal 124 of the ON-timer circuit 111 becomes High level, the signal VQ becomes Low level by the RS-FF circuit 113, and the NMOS transistor 108 is turned off while the NMOS transistor 109 is turned on, to thereby decrease the output voltage Vout. A time period during which the signal VQ is at High level is represented by "Ton", and a time period from when the signal VQ becomes High level to when the signal VQ becomes High level again is represented by "TS". The output voltage Vout is generated from the output terminal 102 through control of the NMOS transistor 108 and the NMOS transistor 109 that serve as output transistors in accordance with a cycle of the time period TS.

As described above, the DC/DC converter according to this embodiment is capable of operating the timer circuit without directly using the output voltage Vout, and hence the shift of the ON-time and a malfunction due to noise of the output voltage Vout can be prevented to achieve stable control. Further, the ON-time signal can be controlled by the duty ratio, and hence the DC/DC converter is capable of operating at a constant operating frequency even when input and output conditions are changed.

Note that, the ON-timer circuit having the configuration according to this embodiment is not limited to be used for the DC/DC converter having the configuration according to this embodiment. In the control of the DC/DC converter having the configuration according to this embodiment, in order to keep the output voltage Vout constant, the relationship of the power supply voltage VDD and the duty is set so that Vout=VDD×duty is established. As long as the DC/DC converter performs such control, the output voltage Vout can be controlled by the ON-timer circuit having the configuration according to this embodiment. For example, a forward DC/DC converter is exemplified.

In the forward DC/DC converter, control is performed based on Vout=VDD×duty×Ns/Np, where Vout represents the output voltage, VDD represents the power supply voltage, Np represents a primary-side winding of a coil as a load, Ns represents a secondary-side winding of the coil as the load. Because Ns/Np is a fixed constant, the output voltage Vout is controlled by the same duty ratio as that of the DC/DC converter having the configuration according to this embodiment. In particular, in the case of Ns=Np, the same control is performed as that of the DC/DC converter having the configuration according to this embodiment.

In the configuration of a general forward DC/DC converter, a switch element is connected to a ground terminal, and when the switch element is turned on and off, the switch element controls a current flowing through the coil as the load, to thereby control the output voltage Vout. A control terminal for turning on and off the switch element is connected to a drive circuit. By inputting the output signal VQ of the RS-FF circuit having the configuration according to this embodiment to the drive circuit, the output voltage Vout can be generated.

As described above, the ON-timer circuit having the configuration according to this embodiment is not limited to be used for the DC/DC converter having the configuration according to this embodiment, and may be used for a DC/DC converter having another configuration.

Further, the DC/DC converter of the present invention has been described as including the pseudo ripple circuit 114, but may have a configuration in which the voltage Vcref0 of the ripple generation circuit 230 is input to the first inverting input terminal of the comparator 112 and the voltage Vcref of the averaging circuit 240 is input to the first non-inverting input terminal. When the DC/DC converter is configured in this manner, the same effects can be obtained even without the pseudo ripple circuit 114.

What is claimed is:

1. A DC/DC converter, comprising:
a first comparator configured to output a result of comparison between a first sum voltage at inverting inputs, obtained by adding a first output voltage of a pseudo ripple component and a divided output voltage of the DC/DC converter, and a second sum voltage at non-inverting inputs, obtained by adding a second output voltage of the pseudo ripple component and a reference voltage;
an ON-timer circuit configured to receive a control signal from an output port of a Reset/Set (RS) flip-flop circuit, the control signal inputs to a drive circuit which controls a gate of one or more output transistor, and the ON-timer circuit outputs an ON-time signal to a R input port of the RS flip-flop circuit, wherein a S input port of the RS flip-flop circuit receives the output result of comparison from the first comparator, wherein the output port of the RS flip-flop circuit outputs the control signal which is synchronized to both the input of the ON-timer circuit and to the drive circuit for controlling the one or more output transistor;
the ON-timer circuit comprising:
a ripple generation circuit configured to generate and output a ripple component based on the control signal received at the input of the ON-timer circuit;
an averaging circuit configured to output a signal obtained by averaging the outputted ripple component of the ripple generation circuit to form a predetermined voltage which is proportional to the output voltage of the DC/DC converter;
a timer circuit configured to generate and output the ON-time signal based on the signal of the averaging circuit and the control signal; and
an activation circuit configured to generate and output the ON-time signal based on the signal of the averaging circuit configured to generate and output the ON-time signal based on the signal of the averaging circuit and the control signal; and
an activation circuit configured to increase a voltage of an output terminal of the ripple generation circuit to the predetermined voltage such that the timer circuit operates without directly using the output voltage of the DC/DC converter to achieve activation stability control in the DC/DC converter.

2. The DC/DC converter according to claim 1, wherein the activation circuit comprises:
a first current source;
a first transistor including a gate and a drain that are connected to the first current source; and
a second transistor including a gate connected to the gate of the first transistor and a source connected to the output terminal of the ripple generation circuit, the second transistor being configured to cause a current to flow to the output terminal of the ripple generation circuit until the output terminal of the ripple generation circuit has reached the predetermined voltage.

3. The DC/DC converter according to claim 1, wherein the activation circuit comprises:
a first transistor including a source connected to the output terminal of the ripple generation circuit, the first transistor being configured to cause a current to flow to the output terminal of the ripple generation circuit until the output terminal of the ripple generation circuit has reached the predetermined voltage;
a pull-up element connected to a gate of the first transistor; and
a second transistor including a gate connected to the output terminal of the ripple generation circuit and a drain connected to the gate of the first transistor.

4. The DC/DC converter according to claim 1, wherein the activation circuit comprises:
a first transistor including a source connected to the output terminal of the ripple generation circuit, the first transistor being configured to cause a current to flow to the output terminal of the ripple generation circuit until the output terminal of the ripple generation circuit has reached the predetermined voltage; and
a constant voltage circuit connected to a gate of the first transistor.

5. The DC/DC converter according to claim 1, wherein the ripple generation circuit comprises:
a second current source;
a switch circuit including one terminal connected to the second current source, and configured to be controlled by the control signal;
a capacitor connected to another terminal of the switch circuit; and
an impedance element connected to said another terminal of the switch circuit.

6. The DC/DC converter according to claim 1, wherein the voltage corresponding to the output voltage, which is input to the first comparator, comprises an output voltage of the averaging circuit.

* * * * *